United States Patent
Short

(10) Patent No.: US 8,302,883 B2
(45) Date of Patent: Nov. 6, 2012

(54) THERMAL PROTECTION FOR A HEATED FUEL INJECTOR

(75) Inventor: Jason C. Short, Henrietta, NY (US)

(73) Assignee: Delphi Technologies, Inc., Troy, MI (US)

( * ) Notice: Subject to any disclaimer, the term of this patent is extended or adjusted under 35 U.S.C. 154(b) by 284 days.

(21) Appl. No.: 12/291,644

(22) Filed: Nov. 12, 2008

(65) Prior Publication Data

US 2010/0116903 A1 May 13, 2010

(51) Int. Cl.
B05B 1/24 (2006.01)
B05C 1/00 (2006.01)

(52) U.S. Cl. ............... 239/135; 239/585.1; 337/389; 337/390; 337/142; 219/517

(58) Field of Classification Search ............ 239/585.1, 239/128–139; 219/517; 337/142, 389, 390
See application file for complete search history.

(56) References Cited

U.S. PATENT DOCUMENTS

| 5,612,662 | A | * | 3/1997 | Drekmeier et al. | 337/389 |
| 5,770,993 | A | * | 6/1998 | Miyazawa et al. | 337/160 |
| 6,102,303 | A | * | 8/2000 | Bright et al. | 239/135 |
| 6,592,052 | B2 | | 7/2003 | Hokao | |
| 7,400,225 | B2 | * | 7/2008 | Shea | 337/147 |
| 7,472,839 | B2 | | 1/2009 | Yasukawa et al. | |
| 7,639,114 | B2 | * | 12/2009 | Yu | 337/405 |

* cited by examiner

*Primary Examiner* — Dinh Q Nguyen
(74) *Attorney, Agent, or Firm* — Thomas N. Twomey

(57) ABSTRACT

A thermal fuse integrated into an electrical circuit powering a heater element having a positive temperature coefficient includes at least one terminal in electrical connection with the heater element thereby connecting the heater element to a power source, and a solder jacket that mechanically retains the electrical connection between the terminal and heater element, wherein a biasing load is applied to the terminal when retained by the solder jacket, and wherein the terminal breaks connection with the heater element under the force of the bias when the solder jacket melts should the heater element overheat. By selecting the solder material forming the solder jacket according to its melt temperature, a temperature specific overheat protection for a heated fuel injector can be provided. Since the injector's metering circuit is separate from the thermal fuse circuit, the fuel injector remains operational even after the heater circuit is opened.

10 Claims, 2 Drawing Sheets

THERMAL PROTECTION FOR A HEATED FUEL INJECTOR

TECHNICAL FIELD

The present invention relates to internal combustion engines; more particularly, to a device for heating and vaporizing liquid fuels used by the engines; and most particularly, to an apparatus and method for thermally protecting a heated fuel injector.

BACKGROUND OF THE INVENTION

Fuel-injected internal combustion engines fueled by liquid fuels, such as gasoline and diesel, and by alcohols, in part or in whole, such as ethanol, methanol, and the like, are well known. Internal combustion engines typically produce power by controllably combusting a fuel/air mixture under compression in a combustion cylinder. For spark-ignited engines, both fuel and air first enter the cylinder where an ignition source, such as a spark plug, ignites the fuel/air charge, typically just before the piston in the cylinder reaches top-dead-center of its compression stroke. In a spark ignited engine fueled by gasoline, ignition of the fuel/air charge readily occurs under almost all ambient temperatures because of the relatively low flash point of gasoline. (The term "flash point" of a fuel is defined herein as the lowest temperature at which the fuel can form an ignitable mixture in air). However, in a spark ignited engine fueled by alcohols such as ethanol, or mixtures of ethanol and gasoline having a much higher flash point, ignition of the fuel/air charge may not occur at all under cold ambient conditions.

In many geographic areas, it is highly desirable to provide some means for enhancing the cold starting capabilities of such spark-ignited engines fueled by ethanol or other blends of alcohol. There are currently several approaches to aid cold starting of such engines. For example, some engines are equipped with an auxiliary gasoline injection system for injecting gasoline into the fuel/air charge under cold start conditions. The use of such auxiliary system adds cost to the vehicle and to the operation of the vehicle and may increase the maintenance required for the engine.

Another approach to aid cold starting of spark-ignited, alcohol fueled engines is to pre-heat the fuel before being ignited in the combustion chamber by spraying the fuel directly onto an off-spaced heat source, causing the fuel to vaporize before being ignited by the spark. Yet another method of pre-heating the fuel is to provide a heat source on the fuel injector itself proximate the injector tip to pre-heat the fuel. With either of the off-spaced heat source or the self-contained heat source, it is necessary to provide sufficient heater power and heater surface area in order to effectively transfer heat to the fuel. This may be done by applying a heater formed of an electrically resistive material, such as a thick film heater element, to the injector or the spray target. In a thick film heater element, the current flowing through the element is inversely proportional to the temperature of the element. This is known as a "positive temperature coefficient" Thus, as the temperature of the element increases, the resistance of the element also increases (and the current increases).

A fuel injector having a self contained heat source requires some form of protection that will protect the fuel injector from exposure to excessive heat should the heater overheat. In an overheat event, the heater element may severely damage the metering components of the fuel injector as well as surrounding engine components. A traditional electrical fusible link that melts and opens the circuit when current flow exceeds a set limit cannot be used to protect the injector from overheating since the current of a positive temperature coefficient heater element decreases with increasing temperature.

What is needed in the art is a thermal protection for a fuel injector heated by a positive temperature coefficient heater element.

It is a principal object of the present invention to provide a simple and inexpensive device and method for automatically disconnecting the heater element from a power source when the heater element reaches a higher than pre-selected temperature.

SUMMARY OF THE INVENTION

Briefly described, a thermal fuse provides thermal protection for a fuel injector or other fuel metering device heated by a heater element having a positive temperature coefficient, where the current flow through the element is inversely proportional to the temperature of the element. The heater element may be, for example, a thick film heater that is applied to the outer circumferential contour of a fuel injector body.

The thermal fuse includes a terminal, a terminal pad, and a solder jacket that mechanically connects the terminal to the terminal pad. The thermal fuse is integrated into the electrical circuit that powers the heater element. When assembled, the terminal is shaped to be spring loaded in a direction to open the circuit, when assembled. During assembly, the terminal is forced into a position in which it makes contact with the terminal pad to complete the circuit for the heater element against the spring load. The terminal is then soldered to the terminal pad forming a solder jacket to hold the terminal in this position against the spring load.

To increase the strength of the solder joint, the terminal may be configured in such a way that the load applied to the joint is perpendicular and centered about the solder connection. This places the solder joint substantially in tension, greatly reducing the stress levels on the solder joint.

During normal operation of the heater element, the solder jacket remains in its solid state thereby retaining the terminal to the terminal pad. If the heater element reaches a temperature that is at or above the re-flow temperature of the solder, the solder jacket softens and the terminal lifts off of the terminal pad opening the circuit. By selecting the solder material according to it's re-flow temperature, the thermal fuse can be preset to open the circuit at a certain temperature. When the circuit opens, power to the heater element ceases. However, since the circuit operating the metering components is separate from the heater circuit, the metering components of the fuel injector remains fully functional.

BRIEF DESCRIPTION OF THE DRAWINGS

The present invention will now be described, by way of example, with reference to the accompanying drawings, in which.

Figure 1:
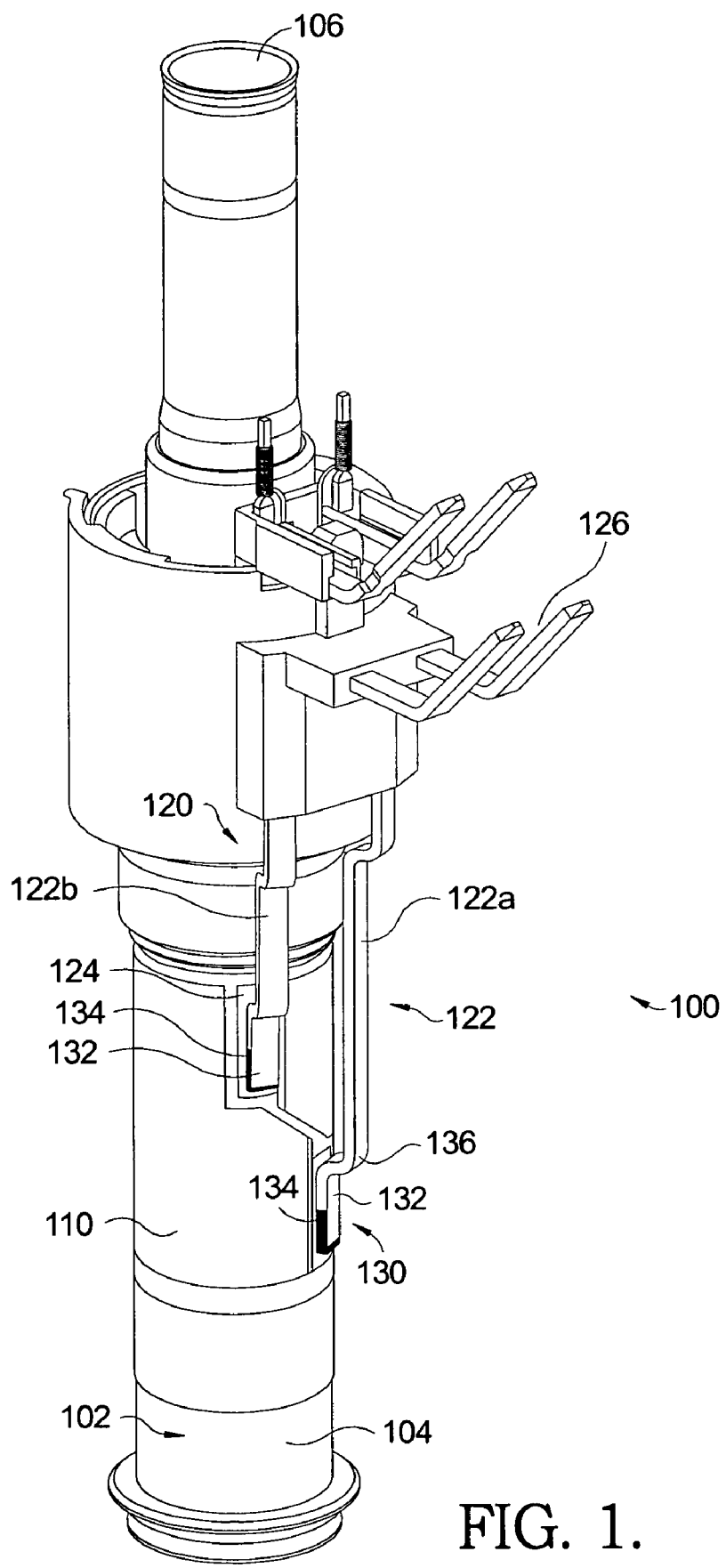
FIG. 1 is an isometric partial view of a heated fuel injector, in accordance with the invention.

Corresponding reference characters indicate corresponding parts throughout the different views. The exemplifications set out herein illustrate various possible embodiments of the invention, including one preferred embodiment in one form, and such exemplifications are not to be construed as limiting the scope of the invention in any manner.

DESCRIPTION OF THE PREFERRED EMBODIMENTS

Referring to FIG. 1, a heated fuel injector 100 includes a heater element 110 applied to an outside surface 104 of an injector body 102, an electrical circuit 120 that electrically connects heater element 110 with a supply voltage, and a thermal fuse 130 integrated into electrical circuit 120 to provide thermal protection for injector 100 if heater element 110 overheats. Two terminals 122 are in electrical contact with heater element 110 via two terminal pads 124. Terminals 122 electrically connect heater element 110 with an electrical connector 126 that is connected to an electrical power source, thereby forming circuit 120.

Either one or both terminals 122 are spring loaded. In an overheat event of heater element 110, solder jacket 134 melts and spring loaded terminal 122 pulls away form terminal pad 124, thereby opening electrical circuit 110. If only one terminal 122 is spring loaded and if the two terminals 122a, 122b have different axial lengths (as shown in FIG. 1), then the longer terminal 122a is preferably spring loaded to decrease the stress on solder jacket 134. In addition, the longer terminal 122a provides a longer lever arm and, therefore, pulls away from body 102 further than a shorter terminal 122b would, in an overheat event of heater element 110.

A fuel passage 106 is formed within body 102. A valve and seat (not shown) are positioned within body 102 to enable a controlled flow of fuel through fuel injector 100. Heater element 110 may be, for example, a thick film heater printed on the outside surface 104 of body 102 as known in the art. Heater element 110 may further be any heater element having a positive temperature coefficient, where the current flow through the element is inversely proportional to the temperature of the element. Fuel injector 100 may be a fuel injector for port injection (as illustrated) or a fuel injector for direct injection of fuel. The fuel flowing through fuel passage 106 of injector 100 may be any type of liquid fuel, for example, an ethanol or other blends of alcohol, gasoline, and diesel.

Figure 2:
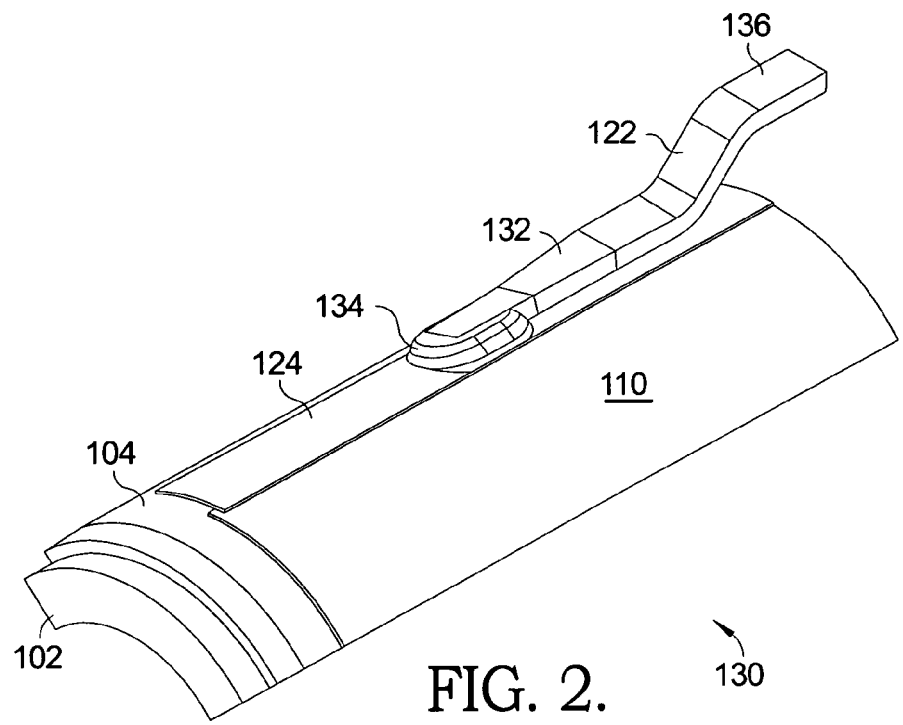
FIG. 2 is an isometric view of a thermal fuse, in accordance with the invention.

Referring to FIG. 2, thermal fuse 130 includes a tip section 132 of terminal 122 that is retained to terminal pad 124 by a solder jacket 134 such that terminal 122 provides an electrical connection to terminal pad 124. Terminal pad 124 is proximate to heater element 110 so that the heat from the element is readily transferred to the terminal pad. Solder jacket 134 is formed during a soldering operation and surrounds at least partially tip section 132 of terminal 122 to cause tip section 132 of terminal 122 to make electrical contact with pad 124. Tip section 132 is designed to be spring loaded away from terminal pad 124. Offset section 136 of terminal 122, distal of tip section 132, is fixedly connected to a mating section of injector body 102. That is, terminal 122 it is designed such that a force 138 (FIG. 3) needs to be applied to tip section 132 of terminal 122 in order to bring tip section 132 in contact with terminal pad 124. Spring loaded tip section 132 is then soldered to terminal pad 124. When assembled and during normal operation of heater element 110, solder jacket 134 mechanically retains tip section 132 of terminal 122 in contact with terminal pad 124.

Figure 3:
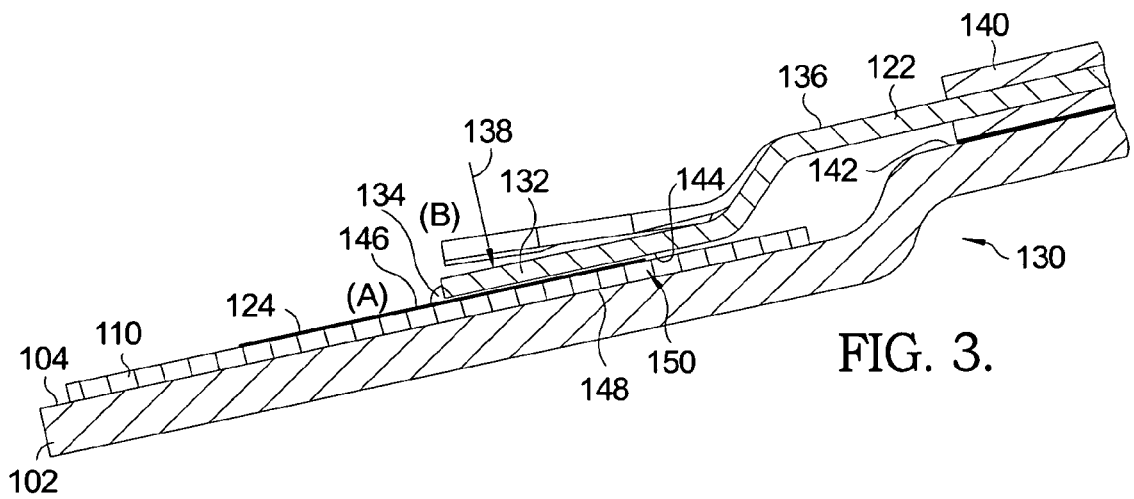
FIG. 3 is a cross-sectional view of the thermal fuse prior to and after overheating of the heater element, in accordance with the invention.

Referring to FIG. 3, tip section 132 of terminal 122 is shown retained to terminal pad 124 by solder jacket 134 (position (A)) as well as not retained by solder jacket 134 (position (B)). Shown in its free state (position (B)), terminal 122 is overmolded by insulator block 140. Then, block 140, along with terminal 122, is fixed to section 142 of injector body 102. Tip section 132 of terminal 122 is then flexed under application of a force 138 into position (A) in order to make contact with terminal pad 124. Spring loaded tip section 132 is soldered to terminal pad 124 and held in place by solder jacket 134.

During normal operation of the injector and heater element, terminal 122 remains in contact with pad 124 (position (A)). However, should the heater element exceed a pre-set temperature limit, solder jacket 134 reaches its reflow temperature and softens, thereby releasing tip section 132 from terminal pad 124. Spring loaded terminal 122 lifts section 132 off of terminal pad 124, opening electrical circuit 120. By opening circuit 120, heater element 110 is disconnected from electrical connector 126 and, therefore, the power supply to heater element 110 is interrupted. Since the electrical circuit operating the fuel injector's metering components is separate from the electrical circuit operating the heater element, injector fuel metering continues; and its metering components are protected from exposure to excessive heat. By selecting the solder material forming solder jacket 134 according to it's re-flow temperature, a temperature specific overheat protection for heated fuel injector 100 can be provided.

Figure 4:
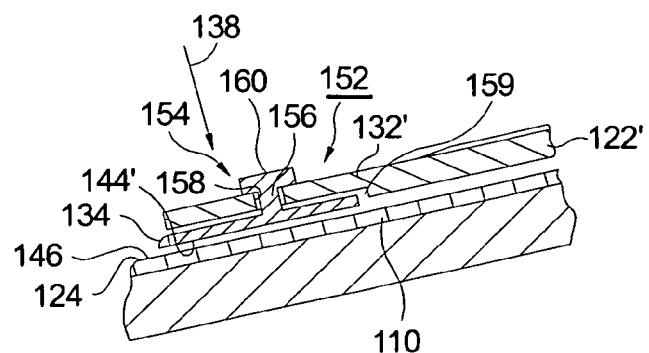
FIG. 4 is cross-sectional view of an alternate thermal fuse.

When solder jacket 134 is formed, liquefied solder flows between surface 144 of terminal 132 and surface 146 of terminal pad 124 so that substantially the entire surface area of the interface between terminal 132 and terminal pad 134 is provided with a thin coat 148 of the solder jacket. Separating stresses caused by spring loaded tip section 132 may be localized on coat 148 along edge 150 which may result in premature separation of the solder joint below the pre-set temperature limit. Referring to FIG. 4, an alternate solder jacket 152 is shown including terminal pad 124, solder jacket 134, terminal tip section 132' and terminal connector 154 electrically connecting terminal 122' to terminal pad 124 via solder jacket 134. Terminal connector 154 is formed of an electrically conductive material and is loosely secured to terminal tip section 132'. Stem 156 extends orthogonally from surface 144' and is received through orifice 158 in undercut 159 of terminal tip section 132'. The size and cross-section shape of stem 156 and of orifice 158 are selected to permit a small degree of lateral movement of the stem within orifice 158. To loosely secure terminal connector 154 to terminal tip section 132', an end 160 of stem 156 may be swaged over after assembly. Alternate means of loosely securing the connector to the tip section, such as for example by pinning, may be employed to equal effect. Tip section 132', including articulating terminal connector 154, is then flexed under application of a force 138 to bring terminal connector surface 144' in contact with surface 146 of terminal pad 124. Spring loaded tip section 132' is then soldered to terminal pad 124 and held in place by solder jacket 134. In this embodiment, separating forces are distributed evenly across the interface surfaces 144', 146. Since terminal connector 154 is permitted to articulate under the spring loaded force of section 132', the load applied to the solder joint is perpendicular and centered about the solder connection. This places solder jacket 134', including thin coat 148, substantially in tension, greatly reducing the stress levels on the solder joint and eliminating the localized stress 150 shown in FIG. 3.

It should be understood that numerous changes may be made within the spirit and scope of the inventive concepts described, including but not limited to other configurations, materials, and locations of vaporization elements. Accordingly, it is intended that the invention not be limited to the described embodiments, but will have full scope defined by the language of the following claims.

What is claimed is:

1. A heated fuel injector, comprising:
an injector body;
a heater element applied to said injector body; and
a terminal having a tip section retained in electrical connection to said heater element by a solder jacket having a predetermined re-melt temperature, said terminal having an offset section distal from said tip section for electrical connection to an electrical power source, wherein said terminal is the electrical point of entry to said heated fuel injector from said electrical power source;
wherein said tip section springs away from said heater element when said heater element reaches said predetermined re-melt temperature, thereby removing said terminal from electrical connection with said heater.

2. The heated fuel injector of claim 1, wherein said heater element has a positive temperature coefficient.

3. The heated fuel injector of claim 1, wherein said heater element is a thick film heater.

4. The heated fuel injector of claim 1 wherein a force is applied to said tip section of said terminal, wherein said force brings said tip section in contact with said heater element, and wherein said force creates a spring load within said terminal.

5. The heated fuel injector of claim 4, wherein said solder jacket mechanically retains said tip section of said terminal in electrical connection with said heater element.

6. The heated fuel injector of claim 1, wherein said offset portion is attached to said injector body.

7. The heated fuel injector of claim 1, wherein said offset portion is in electrical contact with said heater only through said tip portion.

8. The heated fuel injector of claim 1, wherein said terminal is attached to said heater element only at said tip section.

9. The heated fuel injector of claim 1, wherein a portion of said terminal is fixed to said injector body by an insulator block.

10. The heated fuel injector of claim 1, wherein said tip section is the only portion of said terminal retained by solder.

* * * * *